(12) United States Patent
Olbrich et al.

(10) Patent No.: US 9,726,214 B2
(45) Date of Patent: Aug. 8, 2017

(54) MOTOR PLANETARY GEAR ARRANGEMENT AND METHOD FOR CONNECTING A MOTOR HAVING A PLANETARY GEAR MECHANISM FOR PRODUCING A PLANETARY GEAR MOTOR ASSEMBLY

(71) Applicant: IMS GEAR SE & Co. KGaA, Donaueschingen (DE)

(72) Inventors: Christine Olbrich, Wutach-Ewattingen (DE); Matthias Kieninger, Unterkirnach (DE); Uwe Schwoerer, Friedenweiler (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 225 days.

(21) Appl. No.: 14/536,117

(22) Filed: Nov. 7, 2014

(65) Prior Publication Data
US 2015/0240936 A1    Aug. 27, 2015

(30) Foreign Application Priority Data
Feb. 26, 2014    (EP) .................................... 14156740

(51) Int. Cl.
| | | |
|---|---|---|
| *F16H 57/08* | (2006.01) | |
| *F16B 21/18* | (2006.01) | |
| *H02K 7/116* | (2006.01) | |
| *F16H 57/025* | (2012.01) | |
| *F16H 57/02* | (2012.01) | |

(52) U.S. Cl.
CPC ........... *F16B 21/18* (2013.01); *F16H 57/025* (2013.01); *F16H 57/08* (2013.01); *H02K 7/116* (2013.01); *F16H 2057/02034* (2013.01); *Y10T 29/49464* (2015.01)

(58) Field of Classification Search
CPC .. F16H 1/28; F16H 57/08; F16H 2057/02034; F16B 21/18
See application file for complete search history.

(56) References Cited

U.S. PATENT DOCUMENTS

| | | | | |
|---|---|---|---|---|
| 3,992,117 A | * | 11/1976 | Ristau | ...................... F16B 21/18 285/321 |
| 4,092,946 A | | 6/1978 | Kappas | |
| 4,136,982 A | * | 1/1979 | Sagady | ................... F16B 21/18 403/108 |
| 4,413,199 A | | 11/1983 | Fischer | |

(Continued)

FOREIGN PATENT DOCUMENTS

| | | |
|---|---|---|
| CN | 202475133 U | 10/2012 |
| DE | 197 29 988 C1 | 7/1997 |
| DE | 101 45 651 C1 | 9/2001 |

(Continued)

OTHER PUBLICATIONS

Search report of Korean Patent Office for related patent application 10-2015-0009901, issued Mar. 29, 2016.

(Continued)

*Primary Examiner* — Huan Le
(74) *Attorney, Agent, or Firm* — Juneau & Mitchell

(57) ABSTRACT

Provided are variations of a motor and planetary gear assembly comprising a motor, as well as a method for producing such motor and planetary gear assemblies.

12 Claims, 3 Drawing Sheets

(56) References Cited

U.S. PATENT DOCUMENTS

2014/0353067 A1* 12/2014 Fujii .................... B62D 5/0406
                        180/444
2015/0105207 A1* 4/2015 Hagedorn ................. F16H 1/28
                        475/149

FOREIGN PATENT DOCUMENTS

| | | |
|---|---|---|
| DE | 20 2006 006 116 U1 | 4/2006 |
| DE | 10 2008 030 003 A1 | 6/2008 |
| EP | 2 117 789 A2 | 9/2009 |
| GB | 1200 717 | 7/1970 |

OTHER PUBLICATIONS

Search report of European Patent Office for related European patent application 14156740.4-1752, issued Jul. 16, 2014.
Search report of Chinese Patent Office for related patent application 2015 1006 9745.8, issued Dec. 5, 2016.

* cited by examiner

MOTOR PLANETARY GEAR ARRANGEMENT AND METHOD FOR CONNECTING A MOTOR HAVING A PLANETARY GEAR MECHANISM FOR PRODUCING A PLANETARY GEAR MOTOR ASSEMBLY

CROSS REFERENCE TO RELATED APPLICATIONS

This patent application claims priority to European Patent Application 14 156 740.4, filed on Feb. 26, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to an assembly having a motor, which comprises a motor housing, a planetary gear unit that is connected to the motor and that comprises a gear ring having a section, which overlaps a section of the motor housing, and a connecting element, which connects the gear ring to the motor housing (and, as a result, also to the motor, since the motor housing is one of its components).

Background of the Invention

Planetary gear units comprising a sun gear, a planet carrier with planet gears and a gear ring are a well-known option that lends itself very well to many applications, where the objective is to adapt the properties of a motor, in particular, its speed and its torque, to the requirements of a given assembly.

As a result, motor and planetary gear assemblies, in which a motor is connected to a planetary gear unit, are used in many technical applications, in particular, in connection with spindle drives. A popular type of connection provides that the connection takes place by means of the gear ring, where a section of the gear ring overlaps a section of the motor housing and is bolted or pinned to the motor housing of the motor. However, this type of attachment is relatively time consuming to perform and in some cases, in particular, when the connection is to be carried out quickly, inaccurate in terms of an exact orientation of the gear unit and in terms of providing the arrangement with smooth surfaces.

Therefore, the object of the present invention is to provide a motor and planetary gear connection that can be produced quickly and accurately and to provide a method for connecting a motor to a planetary gear unit, in order to produce an assembly.

This engineering object is achieved by means of an assembly exhibiting the features disclosed in any one of the claim 1 or 6 and by means of a method for connecting a motor to a planetary gear unit, in order to produce an assembly exhibiting the features disclosed in any one of the claim 5 or 11. Advantageous further developments of the invention are the subject matter of the dependent patent claims.

The claims 1 and 6 or 5 and 10 respectively are based in each instance on the same operating principle. However, these claims differ with respect to the role that the motor and/or the gear ring of the planetary gear unit play in the implementation of this operating principle, but arise separately from one another due to the exchange of this role.

BRIEF SUMMARY OF THE INVENTION

In a preferred embodiment, an assembly comprising a motor, which has a motor housing, comprising a planetary gear unit that is connected to the motor and that has a gear ring having a section, which overlaps a section of the motor housing, and comprising a connecting element, which connects the gear ring to the motor housing, wherein the connecting element is a round wire snap ring, which engages on the motor side with a recess in the motor housing and which engages on the gear ring side with a recess in the section of the gear ring that overlaps the section of the motor housing.

In another preferred embodiment, the assembly described herein, wherein at least one of the recesses, in particular the recess in the section of the gear ring that overlaps the section of the motor housing exhibits an obliquely extending wall surface, so that the gear ring is axially braced against the motor housing.

In another preferred embodiment, the assembly described herein, wherein the motor-sided end face of the section of the gear ring that overlaps the section of the motor housing exhibits an entering bevel.

In another preferred embodiment, the assembly described herein, wherein the section of the motor housing that is overlapped by the section of the gear ring has a smaller circumference than the portion of the motor housing that is not overlapped by the section of the gear ring, so that the portion of the motor housing that is not overlapped by the section of the gear ring merges planarly with the gear ring.

In another preferred embodiment, a method for connecting a motor to a planetary gear unit for producing an assembly, said method comprising the steps:

providing a motor having a motor housing, which has a recess, providing a planetary gear unit comprising a gear ring, wherein the gear ring has a section for overlapping the section of the motor housing, in which the recess is disposed, wherein a recess is disposed in this section and wherein an entering bevel is disposed on the end face of this section, disposing a round wire snap ring at the recess of the motor housing, slipping the gear ring with the section for overlapping the section of the motor housing onto the motor housing, so that the round wire snap ring is first pushed into the recess of the motor housing by means of the entering bevel and then snaps into the recess of the gear ring with a section.

In another preferred embodiment, a motor and planetary gear assembly comprising a motor, which has a motor housing, comprising a planetary gear unit that is connected to the motor and that comprises a gear ring having a section, which is overlapped by a section of the motor housing, and comprising a connecting element, which connects the gear ring to the motor housing, characterized in that the connecting element is a round wire snap ring, which engages on the motor side with a recess in the section, which overlaps the gear ring, in the motor housing and which engages on the gear ring side with a recess in the gear ring.

In another preferred embodiment, the assembly described herein, wherein at least one of the recesses, in particular, the recess in the section of the gear ring that overlaps the section of the gear ring exhibits an obliquely extending wall surface, so that the gear ring is axially braced against the motor housing.

In another preferred embodiment, the assembly described herein, wherein the gear ring-sided end face of the section of the motor housing that overlaps the section of the gear ring exhibits an entering bevel.

In another preferred embodiment, the assembly described herein, wherein the section of the gear ring that is overlapped by the section of the motor housing has a smaller circumference than the portion of the gear ring that is not overlapped by the section of the motor housing, so that the non-overlapped portion of the gear ring merges planarly with the motor housing.

In another preferred embodiment, the assembly described herein, further comprising an anti-rotation lock that stops the gear ring from rotating relative to the motor housing.

In another preferred embodiment, the assembly described herein, further comprising an anti-rotation lock that stops the gear ring from rotating relative to the motor housing.

In another preferred embodiment, a method for connecting a motor to a planetary gear unit for producing an assembly, said method comprising the steps:

providing a planetary gear unit having a gear ring, wherein the gear ring exhibits a recess, providing a motor having a motor housing, wherein the motor housing exhibits a section for overlapping the section of the gear ring, in which the recess is disposed, wherein a recess is disposed in this section and wherein an entering bevel is disposed on the end face of this section, disposing a round wire snap ring at the recess of the gear ring, and slipping the motor with the section for overlapping the section of the gear ring onto the gear ring, so that the round wire snap ring is first pushed into the recess of the gear ring by means of the entering bevel and then snaps into the recess of the motor housing with a section.

BRIEF DESCRIPTION OF THE DRAWINGS

FIG. 2b is a line drawing evidencing a cropped enlargement of the detail Z from FIG. 2a.

FIG. 3a is a line drawing evidencing a view of a first intermediate state in the course of producing the connection between the motor and the planetary gear unit, shown in the same cross section as in FIG. 2a.

FIG. 3b is a line drawing evidencing a cropped enlargement of the detail X from FIG. 3a.

FIG. 3c is a line drawing evidencing a view of a second intermediate state in the course of producing the connection between the motor and the planetary gear unit, shown in the same cross section as in FIG. 2a.

DETAILED DESCRIPTION OF THE INVENTION

Figure 1:
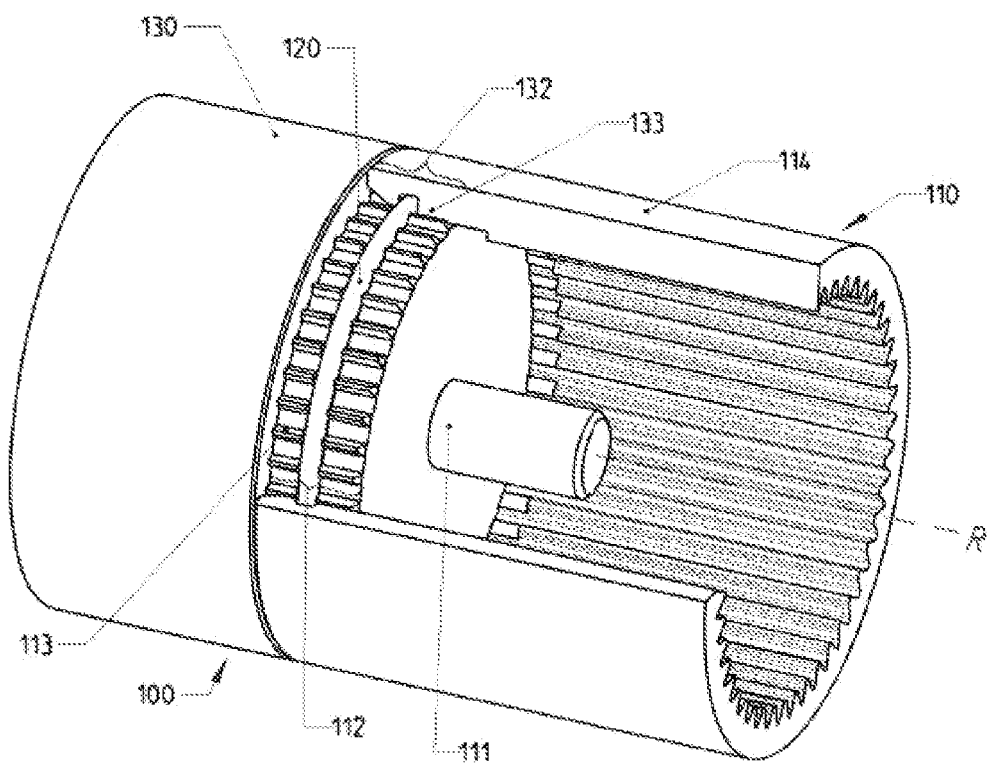
FIG. 1 is a line drawing evidencing a partially opened 3D view of a part of a motor and planetary gear assembly.

The assembly according to the invention has a motor, which comprises a motor housing, a planetary gear unit that is connected to the motor and that comprises a gear ring having a section, which overlaps a section of the motor housing, and a connecting element, which connects the gear ring to the motor housing (and, as a result, also to the motor, since the motor housing is one of its components).

An essential feature of the invention is that the connecting element is a round wire snap ring, which engages on the motor side with a recess in the motor housing and which engages on the gear ring side with a recess in the section of the gear ring that overlaps the section of the motor. It should be clear that this arrangement assumes that the recess in the section of the gear ring that overlaps the section of the motor has to be disposed on the inner side of this section that faces the motor.

Such a connection that is held together by a latching round wire snap ring can be produced not only quickly, but it can also be constructed with high precision, because the geometry of the connection can be exactly defined by means of the recesses arranged in the parts that are to be connected.

It has proven to be especially advantageous, if at least one of the recesses, in particular the recess in the section of the gear ring that overlaps the section of the motor, exhibits an obliquely extending wall surface, so that the gear ring is axially braced against the motor housing. Expediently this is the wall surface of the recess of the gear ring that faces the motor. This functional description implies that the slope of the wall surface extends in such a way that the recess tapers off in the direction of its floor; and consequently the angle between the wall surface and the rotor's axis of rotation of the motor is less than 90 degrees (<90 deg.)

In this way it is possible to achieve, in particular, a high precision positioning of the planetary gear unit in the axial direction.

It should also be noted that the angle, relative to the axis of rotation of the motor and at which the wall surface extends, has an effect on the detachability of the connection. At angles that are greater than 45 degrees, the connection is so strong that it can no longer be detached without damage. At smaller angles, the connection can be detached again; however, at the same time this feature is associated with a weaker connection and a less defined position of the gear ring and, thus, the planetary gear unit relative to the motor.

The connection is very easy to produce, if the motor-sided end face of the section of the gear ring that overlaps the section of the motor exhibits an entering bevel. In this case the term "entering bevel" means that the bevel is arranged in such a way that the inside diameter of the section of the gear ring that overlaps the motor is enlarged in its end section facing the motor. This measure makes it very easy, in the course of slipping the gear ring onto the motor, to insert the round wire snap ring into the internal space of the section of the gear ring that overlaps the motor and then to push said round wire snap ring slowly into the recess in the motor housing.

The assembly is designed in a very advantageous way, when the section of the motor housing that is overlapped by the section of the gear ring has a smaller circumference than the portion of the motor housing that is not overlapped by the section of the gear ring, so that the non-overlapped portion of the motor housing merges planarly with the gear ring or more specifically its outer surface. This arrangement makes it possible to achieve the objective, in particular, in connection with an axial clamping, that an assembly is realized without projections or gaps.

The inventive method for connecting a motor to a planetary gear unit for producing an assembly comprises the steps, which are to be carried out preferably in the order of sequence in which they are stated:

providing a motor comprising a motor housing, which has a recess, providing a planetary gear unit comprising a gear ring, where in this case the gear ring has a section for overlapping the section of the motor, in which the recess is disposed, where in this case a recess is disposed in this section and where in this case an entering bevel is disposed on the end face of this section, disposing a round wire snap ring at the recess of the motor housing, and slipping the gear ring with the section for overlapping the section of the motor onto the motor or more specifically onto the motor housing, so that the round wire snap ring is first pushed into the recess of the motor housing by means of the entering bevel and then snaps into the recess of the gear ring with a section.

At the same time it should be noted that any movement that leads to a decrease in the distance between the gear ring and the motor or more specifically the motor housing may be construed, according to this patent specification, as slipping on the gear ring. Hence, it is immaterial whether the motor is moved and the gear ring is held stationary or vice versa or whether both parts are moved towards each other.

As already stated above, this same operating principle can also be implemented with the same advantages, if the gear ring does not overlap the motor, but rather a section of the motor housing overlaps the gear ring. In this case the motor comprises a motor housing; and the planetary gear unit, which is connected to the motor, has a gear ring with a section, which is overlapped by a section of the motor housing, while the connecting element, which connects the gear ring to the motor housing, remains identical in design. In this case then the essential feature of the invention is that the connecting element is a round wire snap ring, which engages on the motor side with a recess in the section in the motor housing that overlaps the gear ring and which engages on the gear ring side with a recess in the gear ring.

With the above embodiment it is also possible to implement an axial clamping, if at least one of the recesses, in particular, the recess in the section of the gear ring that overlaps the section of the motor, exhibits an obliquely extending wall surface, so that the gear ring is axially braced against the motor housing.

In order to achieve the objective of producing the connection in an easy and simple way when implementing the operating principle, the gear ring-sided end face of the section of the motor housing that overlaps the section of the gear ring can be provided with an entering bevel.

Even in the case of this embodiment of the operating principle it is possible to obtain a planar, almost structureless surface, and, in particular, due to the fact that the section of the gear ring that is overlapped by the motor housing has a smaller circumference than the portion of the gear ring that is not overlapped by the motor housing, so that the non-overlapped portion of the gear ring merges planarly with the motor housing.

In both embodiments of the operating principle it is preferred that an anti-rotation lock stops the gear ring from rotating relative to the motor housing. Such a measure can be implemented, for example, by providing a tooth structure on the external side of the overlapped section of the motor housing or the gear ring respectively and, engaging therewith, a complementary tooth structure on the internal side of the overlapping section of the gear ring or the motor housing respectively.

The method for connecting a motor to a planetary gear unit for producing an assembly, according to the second implementation of the operating principle, comprises the steps:

providing a planetary gear unit comprising a gear ring, where in this case the gear ring exhibits a recess, providing a motor comprising a motor housing, where in this case the motor housing exhibits a section for overlapping the section of the gear ring, in which the recess is disposed, where in this case a recess is disposed in this section and where in this case an entering bevel is disposed on the end face of this section, disposing a round wire snap ring at the recess of the gear ring, and slipping the motor with the section for overlapping the section of the gear ring onto the gear ring, so that the round wire snap ring is first pushed into the recess of the gear ring by means of the entering bevel and then snaps into the recess of the motor housing with a section.

DETAILED DESCRIPTION OF THE FIGURES

FIG. 1 shows a partially opened 3D view of a part of an assembly 100 comprising a motor 110 with a rotor 111 and a motor housing 114 with a recessed motor housing section 112, which is connected by a round wire snap ring 120 to a gear ring 130 having internal teeth 131 of the planetary gear unit, which is shown in the open state. In this respect it is a partial view, because the additional components of the planetary gear unit, in particular, the planet carrier with the planet gears and the sun gear, are not illustrated, because they are irrelevant. As can be seen in FIG. 1, the entire assembly exhibits in essence a cylindrical symmetry, wherein the axis of rotation R of the rotor represents the axis of the cylinder.

The motor housing section 112 of the motor housing 114, which is overlapped by a gear ring section 132, namely the motor-sided end section of the gear ring 130. In the motor housing section 112 there is an external tooth system, with which the complementary internal tooth system 133, which is provided in the gear ring section 132 of the gear ring 130, engages, so that an anti-rotation lock against rotation of the motor 110 relative to the gear ring 130 is present. At the same time it is quite possible and in the illustrated embodiment implemented that the complementary internal tooth system 133 in the gear ring section 132 of the gear ring 130 can deviate from the internal tooth system 131, which the gear ring 130 exhibits, in order to fulfill its function in the planetary gear unit that is not shown in its entirety.

Figure 2A:
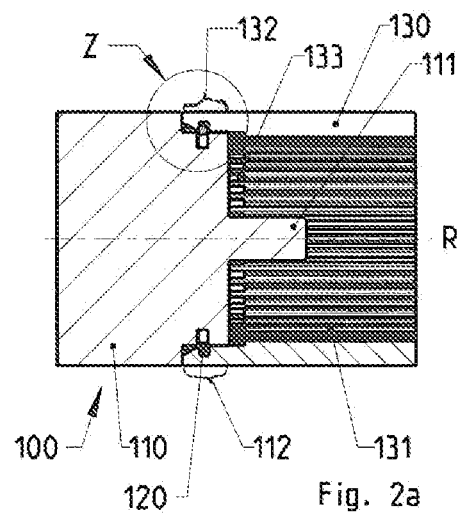
FIG. 2a is a line drawing evidencing a view of a cross section of the motor and planetary gear assembly from FIG. 1, cut along a plane, in which the axis of rotation of the rotor lies.
Figure 2B:
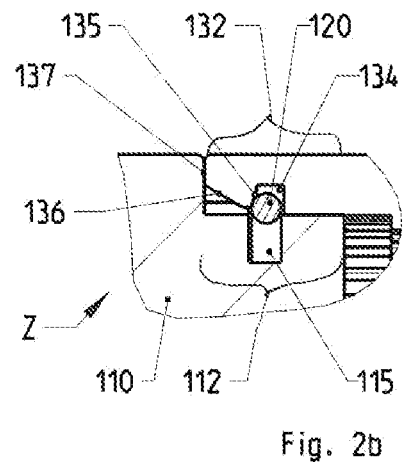

The detailed construction and the operating principle of the connection between the motor 110 and the gear ring 130 by means of the round wire snap ring 120 is shown very clearly in the cross sectional view according to FIG. 2*a* and the enlargement of the detail Z, which is marked by means of a circle (shown in FIG. 2*b*).

It is evident from FIG. 2*b* that the motor housing section 112 of the motor housing has a radially circumferential motor housing recess 115, with which the round wire snap ring 120 engages with a section of its cross section. The gear ring section 132 of the gear ring 130 that overlaps the motor housing section 112 of the motor housing or more specifically the motor also has a radially circumferential gear ring recess 134, with which the round wire snap ring 120 engages with a section of its cross section. The net result of this arrangement is that a connection is produced between the motor 110 or more specifically the motor housing 114 and the gear ring 130.

At the same time the motor-sided wall surface 135 of the gear ring recess 134 exhibits an oblique course and runs at an angle that is less than 90 deg., but greater than 45 deg. relative to the rotor axis R, so that the net effect is that the motor 110 and the gear ring 130 are clamped in the axial direction. This axial clamping is shown in FIG. 2b by the course of the auxiliary line H inside the motor housing recess 115, which does not coincide with a wall surface of the motor housing recess 115, but rather runs into the internal space of said recess. As a result, the snap ring 120 provides by means of its interaction with the obliquely extending, motor-sided wall surface 135 that the front surface 137, which is part of the gear ring section 132 of the gear ring 130 that overlaps a motor housing section 112 of the motor housing 114 and which forms together with the entering bevel 136 the motor-sided end face of the gear ring 130, is pressed against the motor housing 114. This arrangement is associated, on the one hand, with a very high precision of positioning, but, on the other hand, in connection with the measure that the motor housing section 112 of the motor housing 114 that is overlapped by the gear ring section 132 of the gear ring 130 exhibits a smaller circumference than the portion of the motor housing 114 that is not overlapped by the motor housing section 112 of the gear ring 130, so that the non-overlapped portion of the motor housing 114 merges planarly with the gear ring 130 or more specifically its gear ring section 132 that overlaps the motor housing section 112 of the motor housing 114, is associated with an almost structureless surface of the assembly 100.

In this embodiment that is shown as an example, the angle between the bevel 136 and the axis of rotation R of the rotor amounts to about 30 deg. The effect that is targeted with this bevel 136 evolves in the course of fitting together the assembly of the assembly 100, which is described in detail below with reference to the FIGS. 3a to 3d.

Figure 3A:
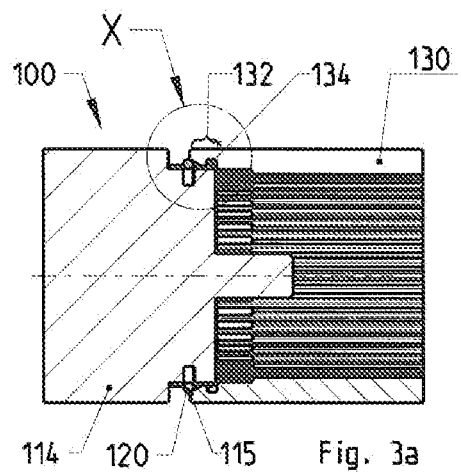
Figure 3B:
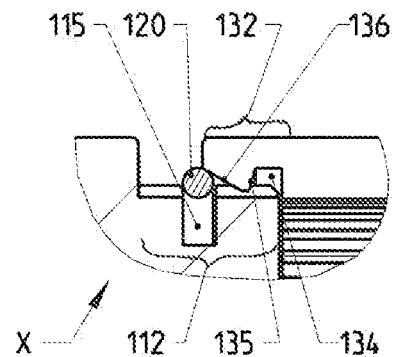

FIG. 3a and the enlargement of the detail X according to FIG. 3b show a first intermediate step in the course of producing an assembly 100 comprising a motor 110 and a gear ring 130 of the planetary gear unit, the additional components of which are not shown. In this stage the motor 110 with the motor housing 114, which exhibits a motor housing recess 115, and the planetary gear unit with the gear ring 130, which has a gear ring section 132 for overlapping the motor housing section 112 of the motor housing 114, in which the motor housing recess 115 is arranged, are already provided with a gear ring recess 134, which is disposed on the gear ring section 132, and an entering bevel 136; and a round wire snap ring 120 is disposed at the motor housing recess 115 of the motor housing 114. Furthermore, the gear ring 130 is already in the process of being slipped onto the motor 110 with the gear ring section 132 for overlapping the motor housing section 112 of the motor housing 114.

Figure 3C:
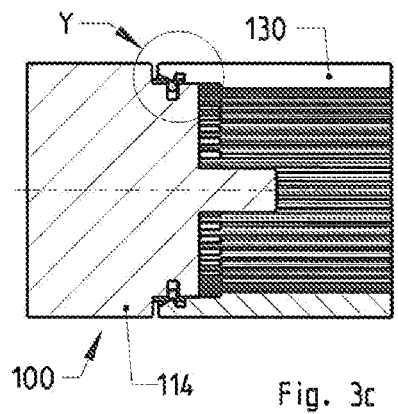
Figure 3D:
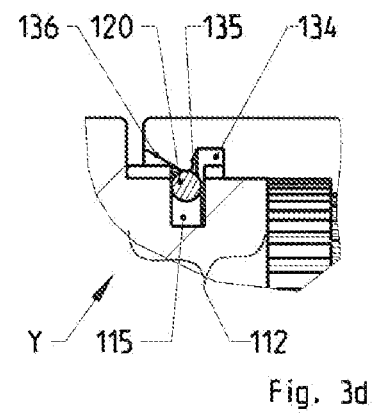
FIG. 3d is a line drawing evidencing a cropped enlargement of the detail Y from FIG. 3c.

If one continues to slip the gear ring 130 (or more specifically the gear ring section 132 of the gear ring 130) onto the motor housing section 112 of the motor housing 114, one passes from the above described first intermediate state to the second intermediate state, which is shown in FIG. 3c and the enlargement of its detail Y, which is depicted as FIG. 3d. The net result is, as one can see, in particular, in FIG. 3d, that the round wire snap ring 120 is pressed into the motor housing recess 115 at the motor housing section 112 of the motor housing 114.

If the gear ring 130 is pushed even further onto the motor 110 or rather the motor housing 114, then the round wire snap ring 120 reaches the gear ring recess 134 and expands into said recess, so that the connection latches. In this case the interaction between the expanding round wire snap ring 120 of the inclined wall 135 of the gear ring recess 134 axially clamps the gear ring 130 with the motor housing 114. Then in this way the assembly 100, shown in the FIG. 1 as well as 2a and 2b, is produced.

Figure 4:
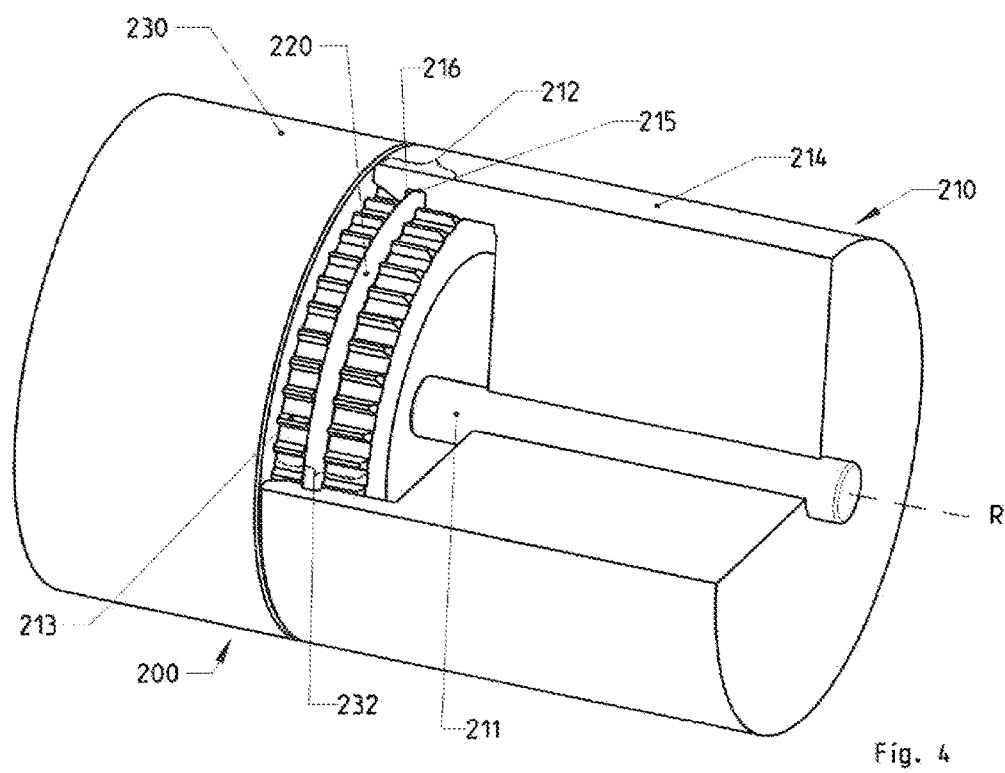
FIG. 4 is a line drawing evidencing a partially opened 3D view of an additional embodiment of a motor and planetary gear assembly that is shown merely for illustrative purposes.

FIG. 4 shows a partially opened 3D view of a part of an assembly 200 with a partially opened motor 210 comprising a rotor 211 and a motor housing 214 with a protruding motor housing section 212, which is connected by means of a round wire snap ring 220 to a gear ring 230 comprising an internal tooth system of the planetary gear unit, where in this case the internal tooth system cannot be recognized from the outside. In this respect it involves a partial view, because the additional components of the planetary gear unit, in particular, the planet carrier with the planet gears and the sun gear, are not depicted, because they are irrelevant. As can be seen in FIG. 4, the entire assembly exhibits in essence a cylindrical symmetry, wherein the axis of rotation R of the rotor represents the axis of the cylinder.

The motor housing section 212 of the motor housing 214 overlaps the motor-sided end gear ring section 232 of the gear ring 230. In the motor housing section 212 there is an internal tooth system, with which a complementary external tooth system 233, which is provided in the gear ring section 232 of the gear ring 230, engages, so that an anti-rotation lock against rotation of the motor 210 relative to the gear ring 230 is present. At the same time it is quite possible and in the illustrated embodiment implemented that the complementary external tooth system 233 in the gear ring section 232 of the gear ring 230 can deviate from the internal tooth system, which the gear ring 230 exhibits, in order to fulfill its function in the planetary gear unit that is not shown in its entirety.

The detailed construction and the operating principle of the connection between the motor 210 and the gear ring 230 by means of the round wire snap ring 220 are identical, apart from the fact that the overlapped gear ring section 232, which corresponds in its function to the motor housing section 112, is now arranged at the gear ring 230, and the overlapping motor housing section 212, which corresponds in its function to the gear ring section 132, is now a part of the motor housing 214, an arrangement that does not have an effect on the interaction of these parts.

Correspondingly the gear ring section 232 of the gear ring 230 has a radially circumferential recess (cannot be seen in FIG. 4), with which the round wire snap ring 220 engages with a section of its cross section. The motor housing section 212 of the motor housing 214 that overlaps the gear ring section 232 of the gear ring 230 also has a radially circumferential motor housing recess 215, with which the round wire snap ring 220 engages with a section of its cross section. The net result of this arrangement is that a connection is produced between the motor 210 or more specifically the motor housing 214 and the gear ring 230.

At the same time the motor-sided wall surface 216 of the motor housing recess 215 exhibits an oblique course and runs at an angle that is less than 90 deg., but greater than 45 deg. relative to the rotor axis R, so that the net effect is an axial clamping of the motor 210 and the gear ring 230, with the effects explained for the above discussed embodiment that is presented as an example.

LIST OF REFERENCE NUMBERS

- 100, 200 assembly
- 110, 210 motor
- 111, 211 rotor
- 112, 212 motor housing section
- 113 external tooth system
- 114, 214 motor housing
- 115, 215 motor housing recess
- 120, 220 round wire snap ring
- 130, 230 gear ring
- 131 internal tooth system
- 132, 232 gear ring section
- 133 complementary internal tooth system
- 134 gear ring recess
- 135 wall surface (of the recess)
- 136 entering bevel
- 137 front surface
- 216 wall surface
- 232 complementary external tooth system
- R axis of rotation of the rotor
- X, Y, Z detail The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An assembly comprising a motor, which has a motor housing, further comprising a planetary gear unit that is connected to the motor, such planetary gear unit having a gear ring and such gear ring having a gear ring section, such gear ring section overlapping a motor housing section, such assembly further comprising a connecting element, which connects the gear ring to the motor housing, wherein the connecting element is a round wire snap ring, which engages on the motor side with a motor housing recess and which engages on the gear ring side with a gear ring recess in the gear ring section that overlaps the motor housing section.

2. The assembly of claim 1, wherein at least one of the recesses, in particular the gear ring recess located in the gear ring section that overlaps the motor housing section, exhibits an obliquely extending wall surface, so that the gear ring is axially braced against the motor housing.

3. The assembly, of claim 1, wherein a motor-sided end face of the gear ring section that overlaps the motor housing section that exhibits an entering bevel.

4. The assembly of claim 1, wherein the motor housing section that is overlapped by the gear ring section has a smaller circumference than the portion of the motor housing that is not overlapped by the gear ring section, so that the portion of the motor housing that is not overlapped by the gear ring section merges planarly with the gear ring.

5. A method for producing the assembly of claim 1 by connecting the motor to the planetary gear unit, said method comprising the steps:

providing the motor having the motor housing, which has the motor housing recess, providing the planetary gear unit comprising the gear ring, wherein the gear ring section overlaps the motor housing section in which the motor housing recess is disposed, wherein the gear ring recess is disposed in the gear ring section and wherein an entering bevel is disposed on an end face of the gear ring section, placing the round wire snap ring at the recess of the motor housing, and slipping the gear ring, with the gear ring section for overlapping the motor housing section, onto the motor housing, so that the round wire snap ring is first pushed into the motor housing recess by means of the entering bevel and then snaps into the gear ring recess.

6. The assembly of claim 1, further comprising an anti-rotation lock that stops the gear ring from rotating relative to the motor housing.

7. An assembly comprising a motor, which has a motor housing, further comprising a planetary gear unit that is connected to the motor and that comprises a gear ring having a gear ring section, which is overlapped by a motor housing section, and comprising a connecting element, which connects the gear ring to the motor housing, wherein the connecting element is a round wire snap ring, which engages on a motor side with a motor housing recess which overlaps the gear ring, and which engages on a gear ring side with a gear ring recess.

8. The assembly of claim 7, wherein at least one of the recesses, in particular, the recess in the motor housing section that overlaps the gear ring section, exhibits an obliquely extending wall surface, so that the gear ring is axially braced against the motor housing.

9. The assembly of claim 7, wherein a gear ring-sided end face of the motor housing section that overlaps the gear ring section exhibits an entering bevel.

10. The assembly of claim 7, wherein the gear ring section is overlapped by the motor housing section, and such gear ring section has a smaller circumference than a portion of the gear ring that is not overlapped by the motor housing section, so that a non-overlapped portion of the gear ring merges planarly with the motor housing.

11. The assembly of claim 7, further comprising an anti-rotation lock that stops the gear ring from rotating relative to the motor housing.

12. A method for producing the assembly of claim 7 by connecting the motor to the planetary gear unit, said method comprising the steps:

providing the planetary gear unit having the gear ring, wherein the gear ring exhibits the gear ring recess, providing the motor having the motor housing, wherein the motor housing section overlaps the gear ring section, wherein the gear ring recess is disposed, wherein the motor housing recess is disposed in the motor housing section and wherein an entering bevel is disposed on an end face of the motor housing section, disposing the round wire snap ring at the gear ring recess, and slipping the motor with the motor housing section onto the gear ring, so that the round wire snap ring is first pushed into the gear ring recess by means of the entering bevel and then snaps into the motor housing recess.

* * * * *